United States Patent
Bordeaux et al.

(10) Patent No.: US 8,375,052 B2
(45) Date of Patent: Feb. 12, 2013

(54) OUTGOING MESSAGE MONITOR

(75) Inventors: Lucas Bordeaux, Cambridge (GB); Youssef Hamadi, Cambridge (GB); Shahram Izadi, Cambridge (GB); Vishwa Vinay, Cambridge (GB)

(73) Assignee: Microsoft Corporation, Redmond, WA (US)

( * ) Notice: Subject to any disclaimer, the term of this patent is extended or adjusted under 35 U.S.C. 154(b) by 562 days.

(21) Appl. No.: 11/866,637

(22) Filed: Oct. 3, 2007

(65) Prior Publication Data

US 2009/0094240 A1    Apr. 9, 2009

(51) Int. Cl.
*G06F 17/30* (2006.01)

(52) U.S. Cl. ........ 707/780; 707/756; 707/769; 707/776; 709/206

(58) Field of Classification Search .......... 707/1, 3, 707/6, 7, 100, 104.1, 726, 737, 749, 752, 707/771, 802, 769, 776, 780; 709/206
See application file for complete search history.

(56) References Cited

U.S. PATENT DOCUMENTS

| | | | |
|---|---|---|---|
| 6,088,717 A * | 7/2000 | Reed et al. ............. | 709/201 |
| 6,161,130 A | 12/2000 | Horvitz et al. | |
| 6,434,601 B1 | 8/2002 | Rollins | |
| 6,654,735 B1 * | 11/2003 | Eichstaedt et al. .......... | 707/749 |
| 6,671,718 B1 | 12/2003 | Meister et al. | |
| 6,775,590 B2 | 8/2004 | Pintsov et al. | |
| 6,970,908 B1 * | 11/2005 | Larky et al. ................. | 709/206 |
| 7,051,077 B2 | 5/2006 | Lin | |
| 7,249,175 B1 | 7/2007 | Donaldson | |
| 7,444,384 B2 | 10/2008 | Horvitz | |
| 7,574,349 B2 * | 8/2009 | Perronnin ..................... | 704/9 |
| 7,603,415 B1 * | 10/2009 | McErlean .................. | 709/206 |
| 7,673,327 B1 * | 3/2010 | Polis et al. .................. | 726/5 |
| 7,698,369 B2 * | 4/2010 | Addante et al. ............. | 709/206 |
| 7,711,779 B2 * | 5/2010 | Goodman et al. ........... | 709/206 |
| 7,814,545 B2 * | 10/2010 | Oliver et al. ................. | 726/22 |
| 7,958,228 B2 * | 6/2011 | Riise et al. .................. | 709/224 |
| 2003/0046421 A1 | 3/2003 | Horvitz et al. | |
| 2004/0177120 A1 | 9/2004 | Kirsch | |
| 2004/0199587 A1 | 10/2004 | McKnight | |
| 2005/0021637 A1 | 1/2005 | Cox | |
| 2005/0060643 A1 * | 3/2005 | Glass et al. ................. | 715/501.1 |
| 2005/0102366 A1 | 5/2005 | Kirsch | |
| 2005/0144245 A1 * | 6/2005 | Lowe ........................... | 709/206 |
| 2005/0153686 A1 * | 7/2005 | Kall et al. .................... | 455/412.1 |
| 2005/0182765 A1 * | 8/2005 | Liddy .............................. | 707/5 |

(Continued)

OTHER PUBLICATIONS

Carenini, et al., "Summarizing Email Conversations with Clue Word", ACM, 2007, pp. 91-100.

(Continued)

*Primary Examiner* — Dangelino Gortayo
(74) *Attorney, Agent, or Firm* — Zete Law, P.L.L.C.; MacLane C. Key (57) ABSTRACT

An outgoing message monitor is provided. In an embodiment, outgoing messages are monitored to detect potential errors and alerts may be triggered. Using information about a message such as an email, a first classifier classifies the email into an expected class and a second classifier classifies the email into an actual class. On the basis of a comparison of the expected and actual classes an alert may be triggered. In an embodiment, the second classifier uses information derived from text content of the email which may optionally be preprocessed. The first classifier, for example, uses other information about the email such as its intended recipients, information about the presence of attachments, information about whether the email is part of a thread and other information.

20 Claims, 6 Drawing Sheets

U.S. PATENT DOCUMENTS

| | | |
|---|---|---|
| 2005/0198159 A1 | 9/2005 | Kirsch |
| 2006/0015942 A1 | 1/2006 | Judge et al. |
| 2006/0031328 A1* | 2/2006 | Malik .......................... 709/206 |
| 2006/0059238 A1 | 3/2006 | Slater et al. |
| 2006/0168057 A1* | 7/2006 | Warren et al. ................ 709/206 |
| 2007/0005708 A1 | 1/2007 | Juliano |
| 2008/0091785 A1* | 4/2008 | Pulfer et al. ................. 709/206 |
| 2008/0162652 A1* | 7/2008 | True et al. .................... 709/206 |

OTHER PUBLICATIONS

Fette, et al., "Learning to Detect Phishing Emails", ACM, 2007, pp. 8.

Hulten, et al., "Filtering Spam E-Mail on a Global Scale", pp. 2.

Kassoff, et al., "Semantic Email Addressing: Sending Email to People, Not Strings", pp. 5.

Lieberman, et al., "Facemail: Showing Faces of Recipients to Prevent Misdirected Email", SOUPS, 2007, pp. 10.

McDowell, et al., "Semantic Email", ACM, 2004, pp. 11.

"The Text Mining Handbook", pp. 64-81.

Graham, "A Plan for Spam", retrieved on Sep. 16, 2009 at <<http://www.paulgraham.com/spam.html>>, Aug. 2002, pp. 1-14.

* cited by examiner

OUTGOING MESSAGE MONITOR

BACKGROUND

Electronic mail has become one of our primary communication media. During a working day, a typical user may receive and send tens or even hundreds of emails. Email messages serve a wide range of purposes. For example, some email messages deal with business issues while some have to do with other aspects of our lives and may contain humor, opinions or personal information.

The ease of use of email tools may also be the source of occasional problems. With email it is very easy to reach our colleagues, customers or employers and to deliver content to a large number of recipients. However, it is also easy to send content by mistake. Even if a type of error has a low probability of occurring, because users typically send thousands of emails per year, that type of error is likely to occur at some point. In fact, most people have experienced at least a couple of times a confusing situation related to an error made in an email message. Some errors in email messages only cause minor embarrassment whilst others may damage the image of a company, the relationships between individuals, or lead to financial, legal or other types of damage.

The embodiments described herein are not intended to be limited to implementations that solve any or all of the above noted disadvantages.

SUMMARY

The following presents a simplified summary of the disclosure in order to provide a basic understanding to the reader. This summary is not an extensive overview of the disclosure and it does not identify key/critical elements of the invention or delineate the scope of the invention. Its sole purpose is to present some concepts disclosed herein in a simplified form as a prelude to the more detailed description that is presented later.

An outgoing message monitor is provided. In an embodiment, outgoing messages such as emails are monitored to detect potential errors and alerts may be triggered. Using information about a message, a first classifier classifies the message into an expected class and a second classifier classifies the message into an actual class. On the basis of a comparison of the expected and actual classes an alert may be triggered. In an embodiment, the second classifier uses information derived from text content of the message which may optionally be pre-processed. The first classifier, for example, uses other information about the message such as its intended recipients, information about the presence of attachments, information about whether the message is part of a thread and other information.

Many of the attendant features will be more readily appreciated as the same becomes better understood by reference to the following detailed description considered in connection with the accompanying drawings.

DESCRIPTION OF THE DRAWINGS

The present description will be better understood from the following detailed description read in light of the accompanying drawings, wherein.

Like reference numerals are used to designate like parts in the accompanying drawings.

DETAILED DESCRIPTION

The detailed description provided below in connection with the appended drawings is intended as a description of the present examples and is not intended to represent the only forms in which the present example may be constructed or utilized. The description sets forth the functions of the example and the sequence of steps for constructing and operating the example. However, the same or equivalent functions and sequences may be accomplished by different examples.

Although the present examples are described and illustrated herein as being implemented in an email system, the system described is provided as an example and not a limitation. As those skilled in the art will appreciate, the present examples are suitable for application in a variety of different types of message sending systems.

It is recognized herein that errors in outgoing email may arise for a variety of reasons. A non-exhaustive list of examples is now given. It is noted that errors may occur as a result of combinations of any one or more of these reasons.

Errors in outgoing email may arise as a result of confusion between "reply" and "reply all" options in an email tool. For example, end users often receive email messages addressed to groups of people. If the end user intends to reply to only the initial sender rather that to the whole group the end user must carefully select a "reply" option rather than a "reply all" option. However, it is very easy to mistakenly select a "reply all" option.

Errors may also arise as a result of an end user dealing with more than one email message at the same time. For example, an end user may have more than one window open at the same time in an email tool, each window displaying a different email message which requires a reply. A typical error is for an end user to confuse the windows and type, say, the content intended for a family member in an email destined for the end user's line manager.

Errors may also arise as a result of use of automated address completion features within email tools. These types of features receive the first part of an email address or contact name and automatically complete the remainder of the email address using pre-specified information. For example, suppose an end user has a list of contacts several of whom have the same first name (e.g. John). If an automated address completion feature is present, the end user may enter the name John and inadvertently cause the email tool to automatically complete the address to the first John in the contacts list, rather than the intended contact.

Errors may also arise as a result of end users forgetting to attach documents or files to an email message. For example, in the text of the email the end user may discuss an attached document but forget to actually attach that document to the email message.

An Exemplary System

Figure 1:
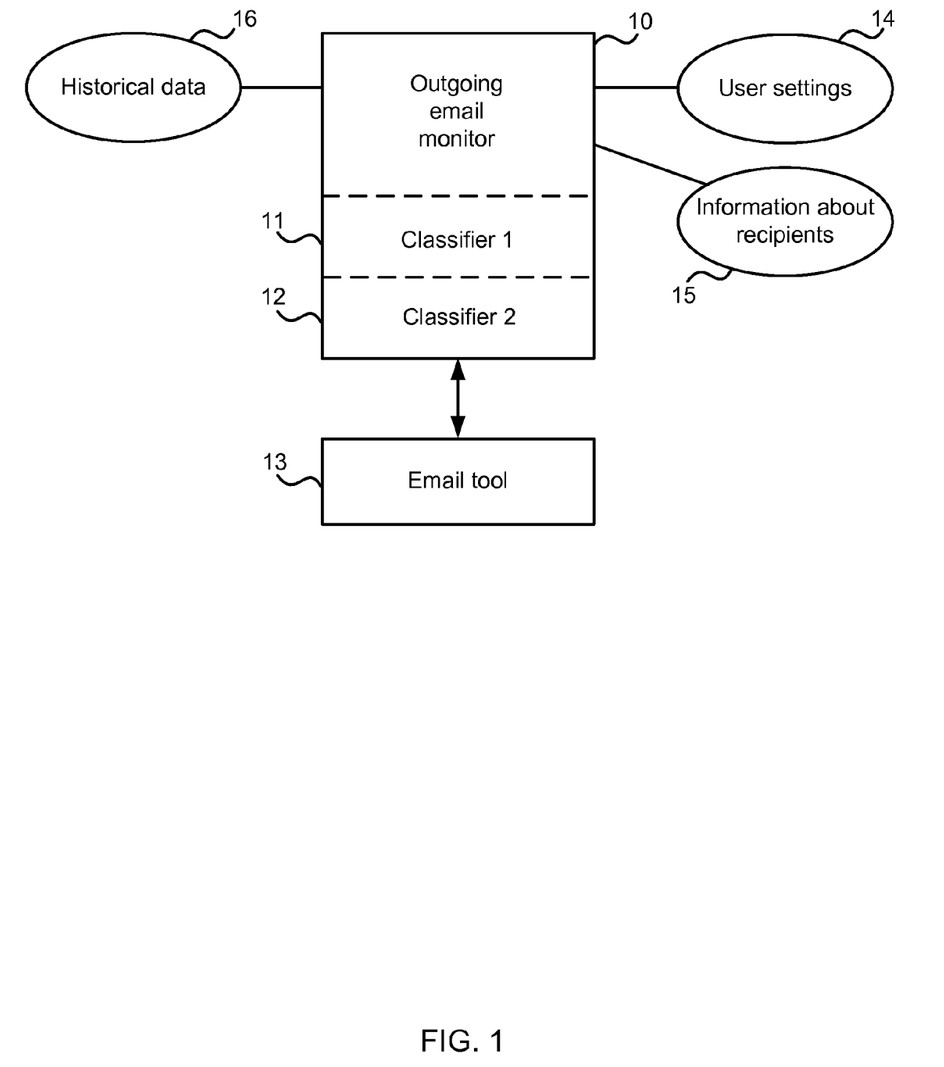
FIG. 1 is a schematic diagram of an outgoing email monitoring system.

FIG. 1 is a schematic diagram of an outgoing email monitoring system 10. The outgoing email monitor has one or more inputs arranged to receive information including historical data 16, user settings 14, information about recipients 15, and is also in communication with an email tool 13. The email tool is of any suitable type for sending, receiving, viewing, creating and/or editing email messages.

The information about recipients may for example comprise a list of contacts together with information about whether those contacts are members of specified groups such as project teams, mailing lists, family groups, groups of friends, work colleagues, work managers or others. The information about recipients may comprise information about geographical location of the recipients, the age group of the recipients, email addresses of the recipients or other information. This information may be pre-configured, may be provided by an end user, may be accessed from other sources automatically or obtained in any other manner.

The historical data 16 comprises information about previous outgoing emails and whether those previous outgoing emails were successful or whether a problem was associated with those outgoing emails. The existence of a problem may be detected automatically, for example, if an email is returned with a delivery failure notice, or may be determined as a result of user input.

The user settings 14 may comprise threshold information for use by the outgoing email monitor, information about rules for use by a classifier of the email monitor, and/or recipient information to be added to the information about recipients 15.

The outgoing email monitor 10 itself comprises two classifiers 11, 12 which are described in more detail below. At least the first classifier is arranged to classify proposed outgoing email messages into one of a plurality of specified classes. An example of 12 such classes of proposed outgoing email is now given. However, this is an example only. Other classes and other numbers and combinations of classes may be used.
work
family
confidential project team
work with attachment
family with attachment
confidential project team with attachment
work reply all
family reply all
confidential project team reply all
work with attachment reply all
family with attachment reply all
confidential project team with attachment reply all The classifiers are of any suitable type such as: rule-based classifiers or statistical classifiers. Rule-based classifiers are logic oriented and may be designed to use the information available from the user settings 14 and/or recipient information 15 and/or any other suitable available information. Examples of statistical classifiers include but are not limited to artificial neural networks, (Naïve) Bayes classifiers, and Maximum entropy classifiers.

At least one of the classifiers is arranged to be updated using a machine learning process either offline, during operation of the outgoing email monitor, or a combination of both.

Exemplary Method

Figure 2:
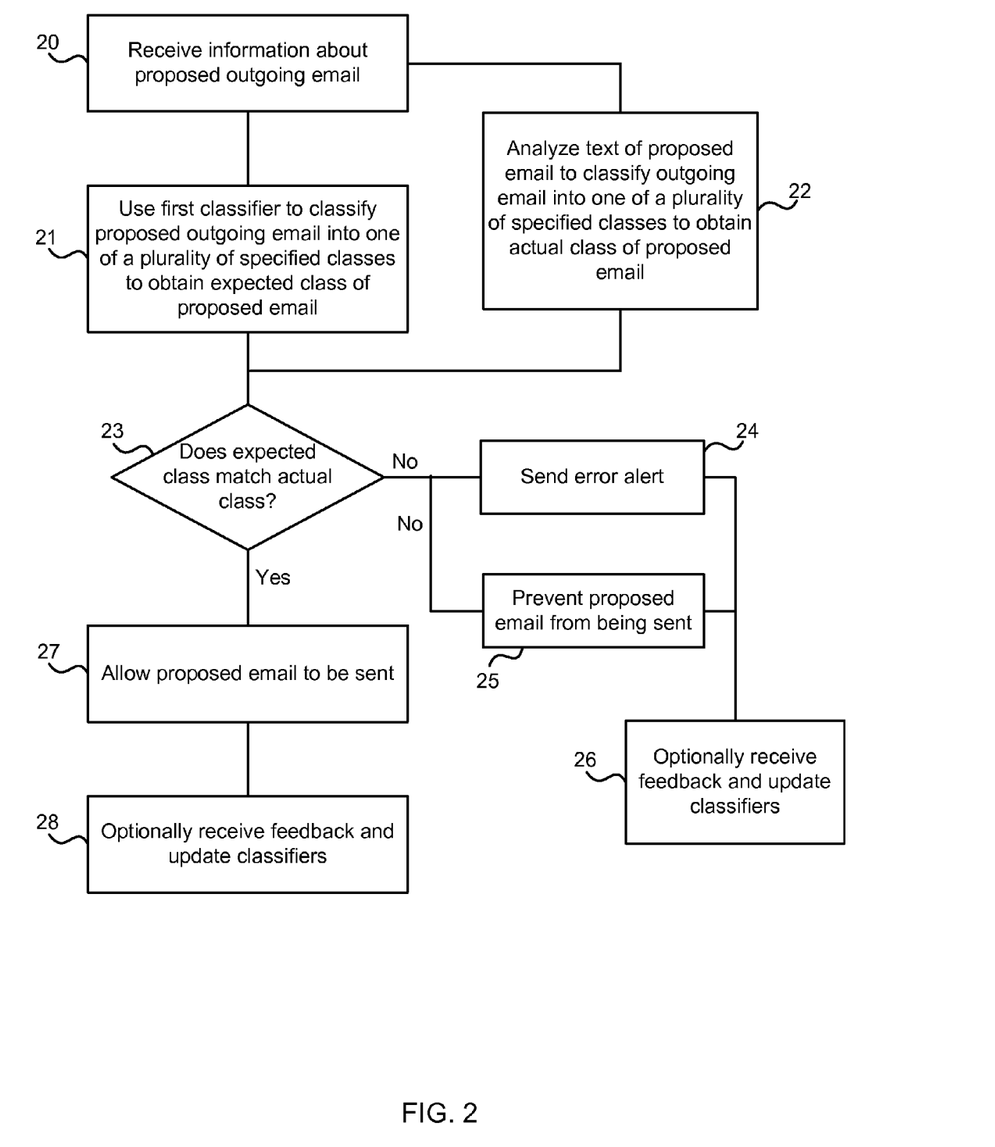
FIG. 2 is a block diagram of a method of operation of an outgoing email monitoring system.

FIG. 2 is a block diagram of a method of operation of an outgoing email monitoring system. Information about a proposed outgoing email is received (block 20) from the email tool 13. For example, this information comprises a copy of the proposed outgoing email, or at least details of all the recipients, names of any attached files, and text from the subject heading and body of the proposed email. The information about the proposed outgoing email can be thought of as comprising content of the email, such as text in the body of the email and metadata. The metadata may comprise details about the recipients, names of any attached files, details about whether the email is part of a thread, historical data relating to the email, information about any priority levels or confidentiality setting associated with the email, or any other information about the email which does not comprise the email content. At least some of this information about the proposed outgoing email is input to a first classifier (block 21) which outputs an expected class for the proposed outgoing email. In parallel or in series with block 21, the second classifier also receives at least some of the information obtained at block 20. The second classifier proceeds to output an actual class for the proposed email (block 22). The first and second classifiers may be different from one another and more detail about these classifiers is given below. One or more of the classifiers may output a selected class together with a confidence value associated with that class.

In some embodiments, the first classifier uses only metadata about the proposed email and does not use information from the actual content in the body of the email. In this case, the second classifier uses only information from the actual content in the body of the email as indicated in FIG. 2 block 22. Thus in this type of embodiment, the first and second classifiers use different input information.

For example, the classifier for determining the expected class of the proposed email takes as input information about an email message other than actual content within the body of the email message or any content of attached files. For example, this input information may comprise any combination of one or more pieces of the following information: intended recipients of email messages, information about whether a proposed email is part of an email thread, information about whether "reply" or "reply all" options have been used, information about whether any file attachments are present, information in a subject field of the email message, information about a priority setting or flag associated with the email message, information about a degree of confidentiality associated with the email message, information about any voting buttons associated with the email message, information about any required receipts associated with the email message or other metadata about the email message.

Using this input information the classifier produces an expected class for each email. For example, an email addressed to a contact labeled as a manager may be classified as a work email.

In some embodiments the classifier outputs a likelihood estimate that an email is of a particular class.

In some embodiments, for example, the classifier for determining the actual class of the proposed email message takes as input information derived only from actual content within the body of that email message or any content of attached files. For example, text content from the body of an email message may be pre-processed to detect key words such as "attachment" and other words or phrases which may be good predictors of whether an email message is of a particular class. These words or phrases which may be good predictors are obtained as a result of a training process using training data about known email messages or in any other suitable manner.

The results of the pre-processing stage are then provided as input to the classifier which produces an actual class as output. A likelihood that a proposed email is of a particular actual class may also be provided by the classifier.

Referring again to FIG. 2 a comparison is made of the expected class and the actual class (block 23). Account may be taken of the confidence values of the classes if available and any applicable thresholds obtained from the user settings 14 are taken into account during this comparison process. If the results of the comparison indicate that a match is present then the proposed email is allowed to be sent (block 27). That is, the outgoing email monitor either actively communicates with the email tool 13 to allow the email to be sent or passively takes no action to prevent this. As a result of the email being sent feedback may be received and used to update one or both of the classifiers (block 28). The feedback may comprise information about whether any problem was experienced with the email. For example, this feedback may be determined automatically or may be entered by a user or operator.

If the results of the comparison indicate that a match is not present then the proposed email may be prevented from being sent (block 25) although this is not essential. Optionally, feedback may be received and used to update one or both of the classifiers (block 26). The feedback may comprise information about whether any problem was experienced with the email and may be determined automatically or may be provided by a user.

In some embodiments the first classifier is arranged to carry out a multi-way classification process. For example, the first classifier may comprise a plurality of sub-classifiers, one sub-classifier for each of the specified classes. Each sub-classifier can be thought of as providing a "one class versus the rest of the classes" classification. The outputs of those sub-classifiers may then be combined to produce an expected class and, optionally, a confidence value associated with the determined expected class. In another example, the first classifier comprises a plurality of sub-classifiers each providing a "one versus another" classification. In that case $N*(N-1)/2$ sub-classifiers are used where N is the number of specified classes. Again, the outputs of the sub-classifiers are combined to provide an expected class and optionally a confidence value associated with that expected class.

Another Exemplary System

Figure 3:
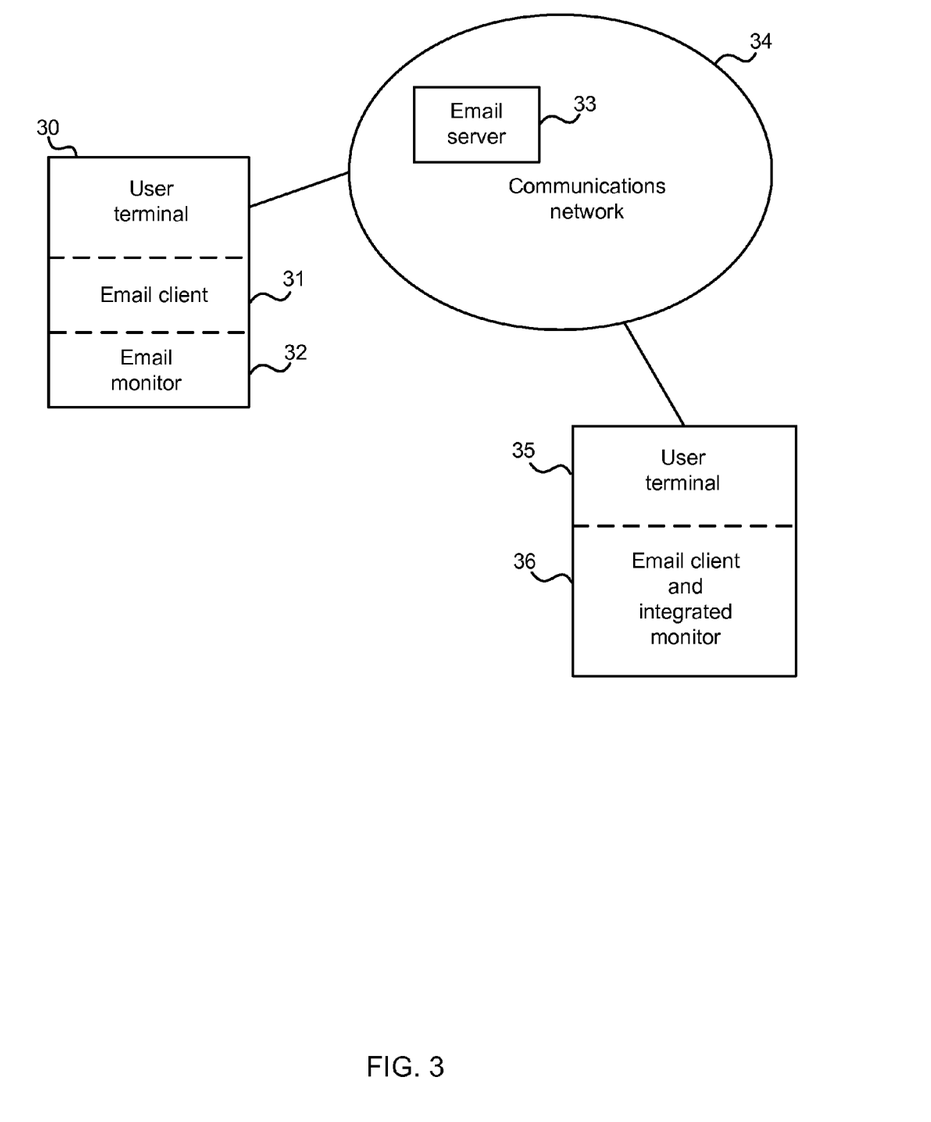
FIG. 3 is a schematic diagram of another example outgoing email monitoring system.

FIG. 3 is a schematic diagram of another example outgoing email monitoring system. A user terminal 30 is provided having an email client 31 suitable for sending and receiving email via an email server 33 at a communications network 34. The user terminal 30 also comprises an email monitor 32 which is able to carry out the methods described herein by monitoring proposed email messages before they are sent to the email server 33 for delivery elsewhere on the communications network 34. For example, the email monitor 32 may sit outside of the email client 31 as a separate process running on the user terminal 30. The email monitor 32 may be arranged to monitor any outgoing email messages such as POP, IMAP or Exchange traffic, and may be arranged to halt any outgoing messages which may contain erroneous data.

In another example, the user terminal 35 comprises an email client 36 for sending and receiving email messages. An email monitor as described herein is then integrated into the email client 36 itself such that the email monitor is able to monitor interactions occurring within the email client 36.

Another Exemplary System

Figure 4:
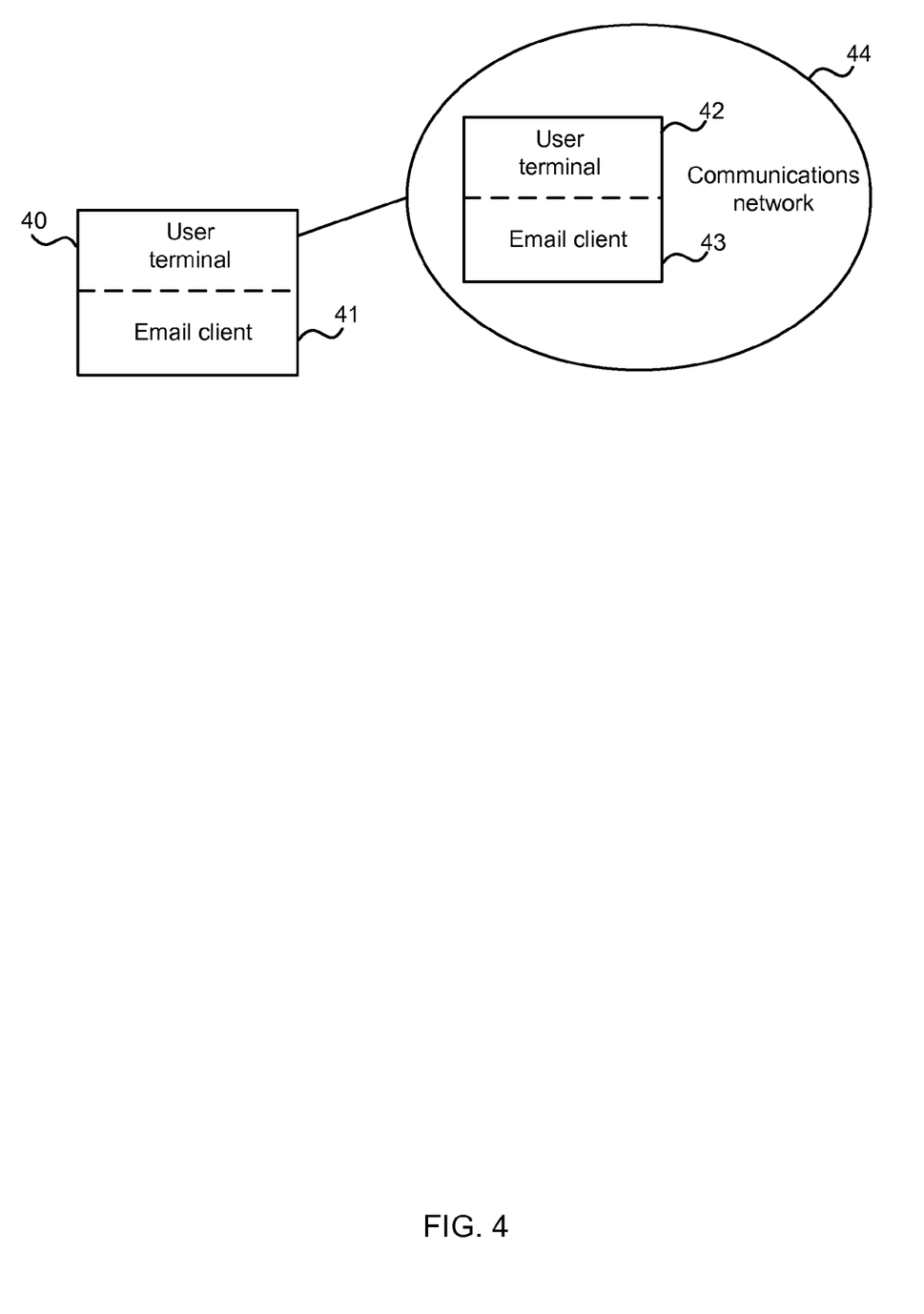
FIG. 4 is a schematic diagram of another example outgoing email monitoring system.

FIG. 4 is a schematic diagram of another example outgoing email monitoring system. A user terminal 40 having an email client 41 for sending and receiving email messages via an email server 42 at a communications network 44 is provided. An email monitor 43 as described herein is provided at the email server 42. In this case the email monitor 43 is integrated server-side as a component of an email server or proxy which is then able to "bounce" email messages which may comprise erroneous content back to the sender.

Figure 5:
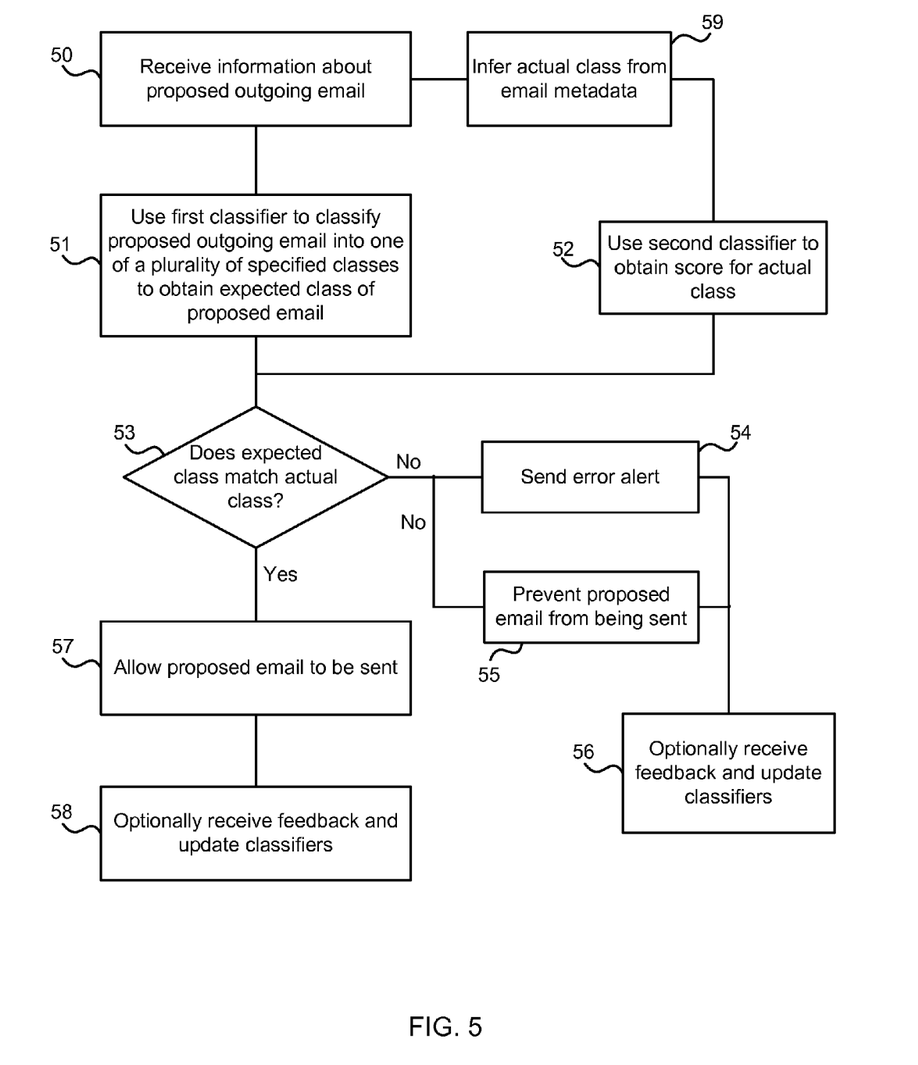
FIG. 5 is a block diagram of another method of operation of an outgoing email monitoring system.

As described above with reference to FIG. 2, the first and second classifiers may take different input information. However, this is not essential. In other embodiments both classifiers may make use of the same or similar information about the proposed email. For example, as shown in FIG. 5, information is received about the proposed outgoing email (block 50). An inference engine is used to infer an actual class of the proposed email on the basis of metadata about the email (block 59). The actual class information is used to select a second classifier from a plurality of second classifiers (one for each of the specified classes). That second classifier is then used to obtain a score for the actual class and optionally also a confidence value associated with the score. The second classifier may take as input any information about the proposed email.

A first classifier is also used to classify the proposed email into one of the specified classes and obtain an expected class (block 51). This first classifier may use only information about the proposed email and it may use the same information as the second classifier.

The expected and actual classes are compared at block 53 and the method proceeds according to blocks 54 to 58 which correspond to blocks 24 to 28 of FIG. 2.

In the case that one or both classifiers produce a likelihood estimate of an email being of a particular class it is possible to tune the level of "disruption" of the email monitor. For example, it is possible to be warned even when a low likelihood of a mismatch (such as a 5% likelihood) between the actual and expected classes is determined. The system may also be arranged to give warnings only in cases that are almost surely errors (such as a 50% or greater likelihood of a difference between the actual and expected classes). It is possible for different thresholds to be set as to when warnings are to be issued, depending on for example, particular recipients. For example, for outgoing emails to company directors even a minor mismatch may be flagged.

Exemplary Computing-Based Device

Figure 6:
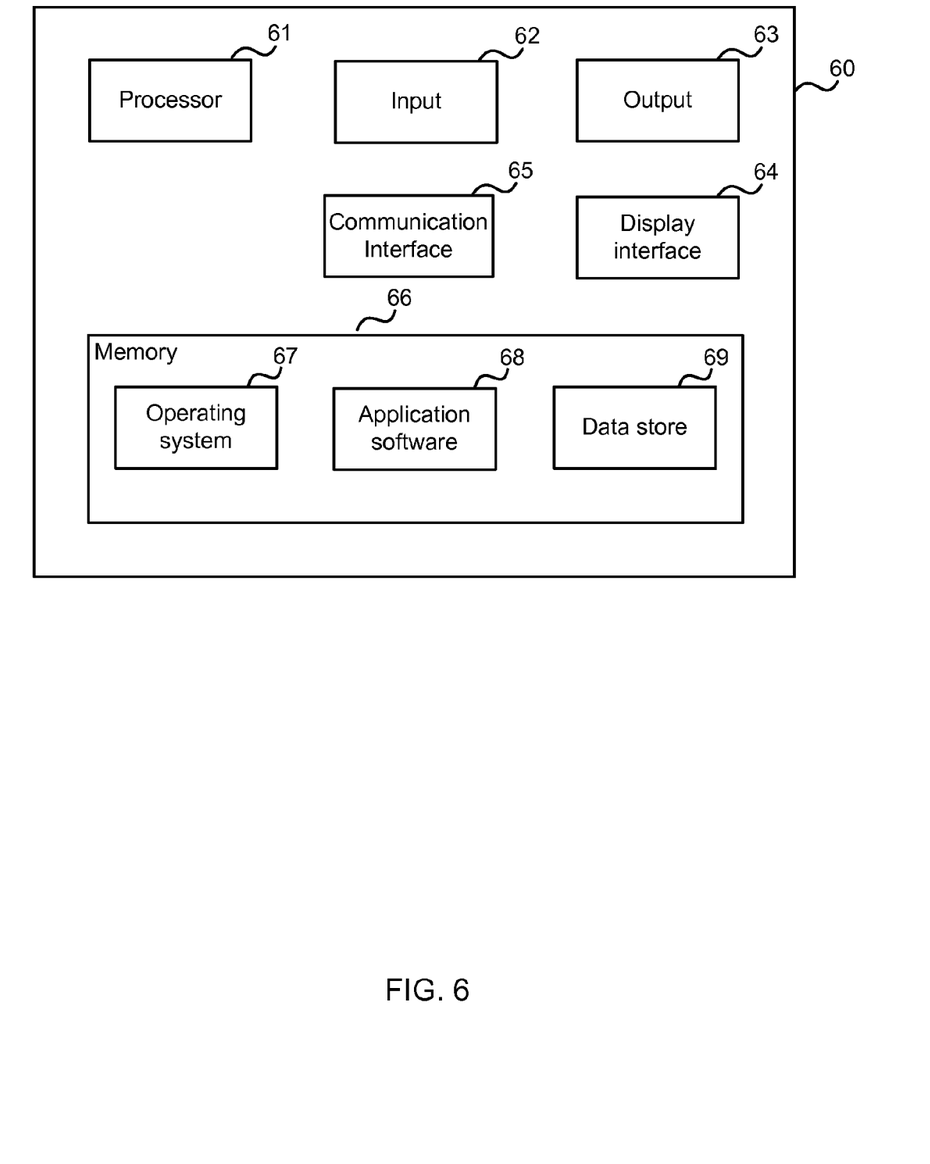
FIG. 6 illustrates an exemplary computing-based device in which embodiments of an outgoing email monitoring system may be implemented.

FIG 6. illustrates various components of an exemplary computing-based device 60 which may be implemented as any form of a computing and/or electronic device, and in which embodiments of an outgoing email monitor may be implemented.

The computing-based device 60 comprises one or more inputs 62 which are of any suitable type for receiving email messages, media content, Internet Protocol (IP) input, or other types of input. The device also comprises communication interface 65 which may be for example, an interface to an email client. Output 63 is also suitable for outputting email messages and/or alerts about proposed email messages.

Computing-based device 60 also comprises one or more processors 61 which may be microprocessors, controllers or any other suitable type of processors for processing computing executable instructions to control the operation of the device in order to monitor outgoing email. Platform software comprising an operating system 67 or any other suitable platform software may be provided at the computing-based device to enable application software 68 to be executed on the device.

The computer executable instructions may be provided using any computer-readable media, such as memory 66. The memory is of any suitable type such as random access memory (RAM), a disk storage device of any type such as a magnetic or optical storage device, a hard disk drive, or a CD, DVD or other disc drive. Flash memory, EPROM or EEPROM may also be used. The memory comprises a data store 69 for storing historical data about email messages, user settings and other information.

A display interface 64 is optionally provided such as an audio and/or video output to a display system integral with or in communication with the computing-based device. The display system may provide a graphical user interface, or other user interface of any suitable type although this is not essential.

The term 'computer' is used herein to refer to any device with processing capability such that it can execute instructions. Those skilled in the art will realize that such processing capabilities are incorporated into many different devices and therefore the term 'computer' includes PCs, servers, mobile telephones, personal digital assistants and many other devices.

The methods described herein may be performed by software in machine readable form on a storage medium. The software can be suitable for execution on a parallel processor or a serial processor such that the method steps may be carried out in any suitable order, or simultaneously.

This acknowledges that software can be a valuable, separately tradable commodity. It is intended to encompass software, which runs on or controls "dumb" or standard hardware, to carry out the desired functions. It is also intended to encompass software which "describes" or defines the configuration of hardware, such as HDL (hardware description language) software, as is used for designing silicon chips, or for configuring universal programmable chips, to carry out desired functions.

Those skilled in the art will realize that storage devices utilized to store program instructions can be distributed across a network. For example, a remote computer may store an example of the process described as software. A local or terminal computer may access the remote computer and download a part or all of the software to run the program. Alternatively, the local computer may download pieces of the software as needed, or execute some software instructions at the local terminal and some at the remote computer (or computer network). Those skilled in the art will also realize that by utilizing conventional techniques known to those skilled in the art that all, or a portion of the software instructions may be carried out by a dedicated circuit, such as a DSP, programmable logic array, or the like.

Any range or device value given herein may be extended or altered without losing the effect sought, as will be apparent to the skilled person.

It will be understood that the benefits and advantages described above may relate to one embodiment or may relate to several embodiments. It will further be understood that reference to 'an' item refers to one or more of those items.

The steps of the methods described herein may be carried out in any suitable order, or simultaneously where appropriate. Additionally, individual blocks may be deleted from any of the methods without departing from the spirit and scope of the subject matter described herein. Aspects of any of the examples described above may be combined with aspects of any of the other examples described to form further examples without losing the effect sought.

It will be understood that the above description of a preferred embodiment is given by way of example only and that various modifications may be made by those skilled in the art. The above specification, examples and data provide a complete description of the structure and use of exemplary embodiments of the invention. Although various embodiments of the invention have been described above with a certain degree of particularity, or with reference to one or more individual embodiments, those skilled in the art could make numerous alterations to the disclosed embodiments without departing from the spirit or scope of this invention.

The invention claimed is:

1. A computer-implemented method comprising:
   receiving information about a proposed outgoing message stored in memory, the received information comprising text content of a body portion of the proposed outgoing message and metadata of the proposed outgoing message;
   using a first classifier to classify the proposed outgoing message into one of a plurality of specified classes, to obtain an expected class of the proposed outgoing message based on the metadata of the proposed outgoing message and not the text content of the body portion of the proposed outgoing message, the first classifier being a multi-way classifier comprising $N*(N-1)/2$ sub-classifiers where N is the number of the plurality of specified classes and each sub-classifier provides a one-to-one classification determination between two specified classes, the metadata comprising one or more of:
      information on whether the proposed outgoing message is part of an email thread;
      information associated with a file attached to the proposed outgoing message;
      information in a subject line of the proposed outgoing message;
      information on voting buttons associated with the proposed outgoing message; and
      information on one or more required receipts associated with the proposed outgoing message;
   using a second classifier different from the first classifier to obtain an actual class of the proposed outgoing message based on the text content of the body portion of the proposed outgoing message and not the metadata of the proposed outgoing message;
   comparing the expected class of the proposed outgoing message based on the metadata and the actual class of the proposed outgoing message based on the text content of the body portion; and
   triggering an alert in response to the comparison failing to yield a match.

2. The computer-implemented method as claimed in claim 1 further comprising pre-processing the text content of the body portion of the proposed outgoing message and inputting results of the pre-processing into the second classifier.

3. The computer-implemented method as claimed in claim 1 further comprising-receiving feedback about the proposed outgoing message and using the feedback to update at least one of the first or second classifiers.

4. The computer-implemented method as claimed in claim 3 further comprising using a machine learning process to update the at least one of the first or second classifier.

5. The computer-implemented method as claimed in claim 1 wherein using the first classifier further comprises obtaining the expected class together with a likelihood estimate associated with the expected class.

6. The computer-implemented method as claimed in claim 1 wherein using the second classifier further comprises obtaining the actual class together with a likelihood estimate associated with the actual class.

7. The computer-implemented method as claimed in claim 1 wherein the comparing comprises using a specified threshold.

8. A hardware computer-readable storage medium storing instructions which, when executed, cause one or more processors to perform actions, the actions comprising:
   receiving information about a proposed outgoing message stored in memory, the received information comprising text content of a body portion of the proposed outgoing message and metadata of the proposed outgoing message;

using a first classifier to classify the proposed outgoing message into one of a plurality of specified classes, to obtain an expected class of the proposed outgoing message based on the metadata of the proposed outgoing message and not the text content of the body portion of the proposed outgoing message, the first classifier being a multi-way classifier comprising N*(N-1)/2 sub-classifiers where N is the number of the plurality of specified classes and each sub-classifier provides a one-to-one classification determination between two specified classes, the metadata comprising one or more of:

information on whether the proposed outgoing message is part of an email thread;

information associated with a file attached to the proposed outgoing message;

information in a subject line of the proposed outgoing message;

information on voting buttons associated with the proposed outgoing message; and information on one or more required receipts associated with the proposed outgoing message;

using a second classifier different from the first classifier to obtain an actual class of the proposed outgoing message based on the text content of the body portion of the proposed outgoing message and not the metadata of the proposed outgoing message;

comparing the expected class of the proposed outgoing message based on the metadata and the actual class of the proposed outgoing message based on the text content of the body portion; and triggering an alert in response to the comparison failing to yield a match.

9. The hardware computer-readable storage medium as claimed in claim 8 further comprising pre-processing the text content of the body portion of the proposed outgoing message and inputting results of the pre-processing into the second classifier.

10. The hardware computer-readable storage medium as claimed in claim 8 further comprising receiving feedback about the proposed outgoing message and using the feedback to update at least one of the first or second classifiers.

11. The hardware computer-readable storage medium as claimed in claim 10 further comprising using a machine learning process to update the at least one of the first or second classifier.

12. The hardware computer-readable storage medium as claimed in claim 8 wherein using the first classifier further comprises obtaining the expected class together with a likelihood estimate associated with the expected class.

13. The hardware computer-readable storage medium as claimed in claim 8 wherein using the second classifier further comprises obtaining the actual class together with a likelihood estimate associated with the actual class.

14. The hardware computer-readable storage medium as claimed in claim 8 wherein the comparing comprises using a specified threshold.

15. A apparatus comprising:
one or more processors;
a receiver configured to receive information about a proposed outgoing message stored in memory, the received information comprising text content of a body portion of the proposed outgoing message and metadata of the proposed outgoing message;
a first classifier configured to classify the proposed outgoing message into one of a plurality of specified classes, to obtain an expected class of the proposed outgoing message based on the metadata of the proposed outgoing message and not the text content of the body portion of the proposed outgoing message, the first classifier being a multi-way classifier comprising N*(N-1)/2 sub-classifiers where N is the number of the plurality of specified classes and each sub-classifier provides a one-to-one classification determination between two specified classes, the metadata comprising one or more of:
information on whether the proposed outgoing message is part of an email thread;
information associated with a file attached to the proposed outgoing message;
information in a subject line of the proposed outgoing message;
information on voting buttons associated with the proposed outgoing message; and
information on one or more required receipts associated with the proposed outgoing message;
a second classifier different from the first classifier configured to obtain an actual class of the proposed outgoing message based on the text content of the body portion of the proposed outgoing message and not the metadata of the proposed outgoing message;
a comparing unit configured to compare the expected class of the proposed outgoing message based on the metadata and the actual class of the proposed outgoing message based on the text content of the body portion; and
a triggering unit configured to trigger an alert in response to the comparison failing to yield a match.

16. The apparatus as claimed in claim 15 further comprising a pre-processing unit configured to pre-process the text content of the body portion of the proposed outgoing message and inputting results of the pre-processing into the second classifier.

17. The apparatus as claimed in claim 15 further comprising a feedback receiver configured to receive feedback about the proposed outgoing message and an updater configured to use the feedback to update at least one of the first or second classifiers.

18. The apparatus as claimed in claim 17 further comprising a machine learning unit configured to update the at least one of the first or second classifier.

19. The apparatus as claimed in claim 15 wherein the first classifier is further configured to obtain the expected class together with a likelihood estimate associated with the expected class.

20. The apparatus as claimed in claim 15 wherein the second classifier is further configured to obtain the actual class together with a likelihood estimate associated with the actual class.

* * * * *